(12) United States Patent
Williams et al.

(10) Patent No.: US 7,937,935 B2
(45) Date of Patent: May 10, 2011

(54) METHOD FOR CONTROLLING CATALYST AND FILTER TEMPERATURES IN REGENERATION OF A CATALYTIC DIESEL PARTICULATE FILTER

(75) Inventors: John D. Williams, New Palestine, IN (US); Tanto Sugiarto, W. Lafayette, IN (US); George N. Simopoulos, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 750 days.

(21) Appl. No.: 12/011,536

(22) Filed: Jan. 28, 2008

(65) Prior Publication Data

US 2009/0188243 A1 Jul. 30, 2009

(51) Int. Cl.
*F01N 3/00* (2006.01)
(52) U.S. Cl. .............................. 60/295; 60/297
(58) Field of Classification Search ........ 60/295
See application file for complete search history.

(56) References Cited

U.S. PATENT DOCUMENTS

| | | | |
|---|---|---|---|
| 6,735,941 B2 | 5/2004 | Saito et al. | 60/295 |
| 7,231,761 B2 | 6/2007 | Okugawa et al. | 60/295 |
| 2006/0042237 A1* | 3/2006 | Nonoyama et al. | 60/297 |
| 2006/0059901 A1* | 3/2006 | Saito et al. | 60/297 |
| 2006/0225409 A1* | 10/2006 | Kuboshima et al. | 60/295 |

FOREIGN PATENT DOCUMENTS

JP 2003254042 A * 9/2003
* cited by examiner

*Primary Examiner* — Thomas E Denion
*Assistant Examiner* — Jason Shanske
(74) *Attorney, Agent, or Firm* — Thomas N. Twomey

(57) ABSTRACT

A system for managing regeneration of a CDPF in a diesel engine. The system determines volatility of the accumulated soot by a weighting/indexing method to select a regeneration control strategy that protects the CDPF from thermal damage. The system determines the mass of wet soot and dry soot accumulated over the previous driving cycle and selects a management strategy to control the rate of temperature increase and the thermal gradient imposed upon the filter. The wet soot percent is an index for setting the regeneration temperature control profile for an allowable total accumulated soot mass as a function of the accumulated wet soot. The method also scales the soot mass regeneration threshold value based upon wet soot accumulation and accumulation rate and provides an indicator of combustibility of the soot accumulation. The method provides a temperature ramp rate, total regeneration time, and exhaust oxygen level required to control regeneration.

8 Claims, 7 Drawing Sheets

METHOD FOR CONTROLLING CATALYST AND FILTER TEMPERATURES IN REGENERATION OF A CATALYTIC DIESEL PARTICULATE FILTER

TECHNICAL FIELD

The present invention relates to exhaust emission control systems for internal combustion engines; more particularly, to methods for regenerating an exhaust gas particulates filter in a diesel engine exhaust system; and most particularly, to a method for optimizing timing of regeneration and for controlling temperature in a diesel particulates filter during regeneration thereof to prevent thermal damage to the filter.

BACKGROUND OF THE INVENTION

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot".

It is known to use catalytic particulate filters which physically trap the soot particulates. However, catalytic diesel particulate filters (CDPF) progressively load up with accumulated soot and therefore must be repeatedly regenerated by catalytically oxidizing the trapped particulates, typically on a fixed schedule and by fuel enrichment of the exhaust stream entering the CDPF.

Typically, prior art regeneration systems are temperature based with the primary protection strategy being limitation of the quantity of soot allowed to accumulate. As shown below, this serves to under-utilize the filter capacity and results in a penalty in fuel economy.

A currently challenging durability issue in the CDPF art is cracking or melting of a CDPF substrate due to large temperature excursions within the bed of the filter during regeneration. These temperature excursions are caused by the exothermic reaction of carbon and oxygen when the soot loading exceeds approximately 5 grams per liter of CDPF substrate and the flow rate of cooling exhaust through the CDPF is reduced by idle or low-load engine operating conditions. Under these conditions, the exhaust contains a high percentage of oxygen (18% or more), thus fueling a very rapid combustion of the soot. A low total flow rate reduces convective cooling of the hot substrate. This combination of events (rapid combustion and low cooling) can result in excessive filter temperature and/or temperature gradients, resulting in substrate failure.

A factor only recently recognized in CDPF regeneration is the relative combustibility of wet soot versus dry soot, both of which can be present in a CDPF. So-called "wet" soot is soot impregnated with unburned hydrocarbon fuel residues and is produced during conditions of low engine combustion efficiency. Wet soot is now known to be much more volatile and to burn much hotter than dry soot during catalytic regeneration. A high level of wet soot in a CDPF can lead to an uncontrolled combustion event that can damage or completely destroy a CDPF. Thus, it is important to be able to monitor the percentage of wet soot accumulated in a CDPF as well as the overall amount of soot.

U.S. Pat. No. 6,735,941 B2 discloses a method for calculating the total soot mass accumulated in a CDPF by measuring differential pressure across the CDPF. This method does not recognize the functional (combustional) difference between wet soot and dry soot; does not determine the percentage of total soot that is wet soot; and does not provide a strategy for burning off the wet soot in a controlled manner before completing oxidation of the dry soot, to protect against thermal damage to a CDPF.

U.S. Pat. No. 7,231,761 discloses a method for regeneration of a CDPF wherein a post-combustion injection quantity of fuel required during regeneration is determined by means of measured soot mass accumulated with the CDPF. (As used herein, the term "post-combustion" refers to engine combustion in the engine cylinders.) During regeneration, this post-combustion fuel injection value is corrected by application of a correction factor determined from the deviation between target temperature and actual temperature within the CDPF in an attempt to prevent an uncontrolled burnout from occurring. This method also does not provide a strategy for burning off the wet soot in a controlled manner before completing oxidation of the dry soot as is highly desirable to protect against thermal damage to a CDPF.

What is needed in the art is a method for calculating the wet soot fractional percentage of a soot load in a CDPF; determining a "combustibility value" for the overall soot content; and selecting a thermal management strategy to be used during regeneration that controls the temperature increase rate and, hence, the thermal gradient of the CDPF monolith to burn off the volatile compounds in the wet soot in a controlled manner before completing oxidation of the dry soot.

It is a principal object of the present invention to prevent damage to a CDPF substrate by overheating during regeneration thereof.

SUMMARY OF THE INVENTION

Briefly described, a system for managing regeneration of a CDPF in a diesel engine provides a means for determination of the potential combustibility (volatility) of the soot accumulation with the CDPF by means of a weighting and indexing method to select a regeneration control strategy required to protect the CDPF substrate from thermal damage. The system utilizes engine-related combustion parameters for determining the mass of wet soot and dry soot accumulated over the previous driving cycle. This information is then used to select a thermal management strategy to control the rate of temperature increase during regeneration and hence the thermal gradient imposed upon the filter monolith.

A control function determines in real time the percentage of wet soot accumulation and reduction within the CDPF as a function of engine operating conditions. The percent wet soot value is then used as an index in setting the regeneration event timing and temperature control profile for an allowable total accumulated soot mass accumulation as a function of the accumulated wet soot mass.

Additionally, this method allows for scaling of the soot mass threshold value based upon the wet soot accumulation in the filter and the real time accumulation rate. As such, a control method is employed to adjust the soot load trigger value as an Equivalent Soot Mass that is an indicator of the volatility/combustibility of the soot accumulation and can be utilized in a process that protects the CDPF monolith. The method provides an allowable temperature ramp rate of regeneration during a warm-up phase, total regeneration time required, and an oxygen control scheme to moderate or extinguish a runaway regeneration event.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
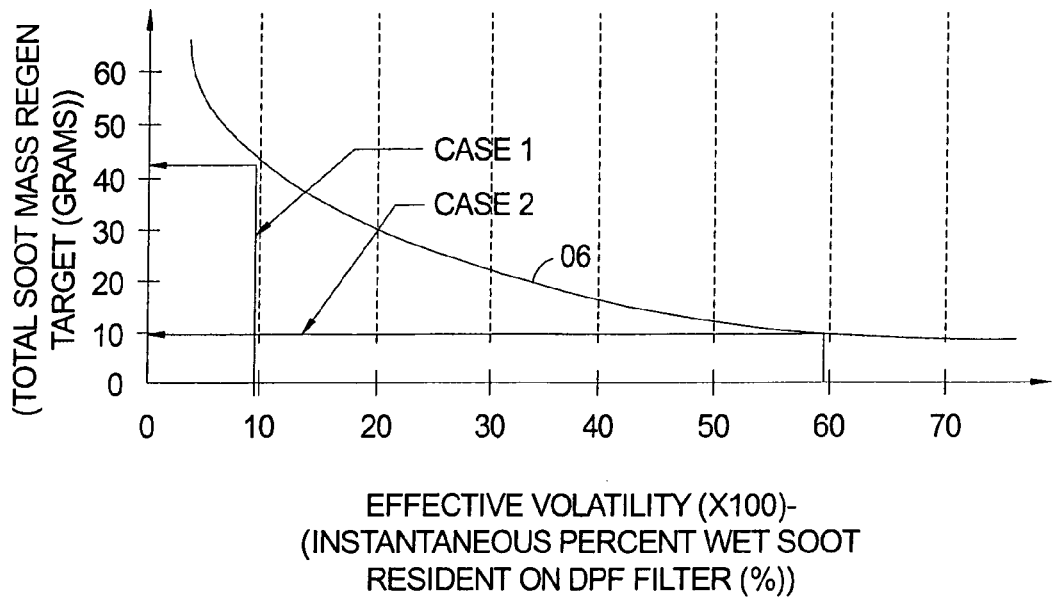
FIG. 1 is a graph showing total soot target value to trigger initiation of a CDPF regeneration event as a function of the wet soot load.

In a prior art system for managing diesel exhaust emissions, a diesel engine is supplied with intake air and fuel from a fuel source. Fuel is injected into the combustion cylinders of the engine near or at the start of the firing or power stroke to generate engine torque and engine exhaust. The engine exhaust is passed through a Catalytic Diesel Particulate Filter (CDPF) and optionally through a Lean Nitrogen Trap (LNT) that may be disposed ahead of or after the CDPF. Treated exhaust is passed to the atmosphere.

Typically, an LNT is disposed ahead of a CDPF in light-duty diesel applications wherein trapping of nitrogen oxides formed during start-up conditions is important. Placing the LNT adjacent the engine allows for maximum rate of warming of the LNT after engine start. In heavy-duty diesel applications, dealing generally with higher loads and higher exhaust temperatures, the temperature window for an LNT may be exceeded if the LNT is placed adjacent the engine; therefore, the LNT typically is spaced from the engine by a CDPF, resulting in cooler conditions in the LNT.

As noted above, a serious problem can arise under engine operating conditions of light load and/or low speed or idle wherein the flow of exhaust is relatively low and the oxygen percentage is relatively high.

It has been found that spontaneous combustion of CDPF soot deposits occurs within acceptable temperature limits if the flow of exhaust gas through the CDPF is high, as at elevated engine speeds. Thus, under normal engine operating conditions, soot accumulated within the CDPF under conditions of low fuel efficiency will be burned off automatically when the engine returns to higher engine speeds and loads.

However, if regenerative combustion in the CDPF is conducted under conditions of low exhaust flow and high oxygen content, combustion may be suppressed and controlled in accordance with the invention by also reducing the oxygen content of the exhaust gas stream entering the CDPF to about 6%, which is accomplished by injecting fuel into the exhaust stream to combustively scavenge oxygen. As the oxygen content of diesel exhaust can average about 18%, a method for controlling the oxygen content below about 6% requires a strategy for scavenging oxygen in the exhaust stream. It is an important aspect of a method and apparatus in accordance with the invention to scavenge oxygen in the exhaust stream by controlled introduction of fuel into the exhaust stream, and subsequent combustion thereof along with some of the oxygen residual in the exhaust gas, ahead of the CDPF.

The primary objective of the present invention is to provide a method for regeneration control of a Long Aspect Ratio cordierite Diesel Particulate Filter (DPF). Once the engine-out soot quantities and the time-based soot accumulation are known, a method in accordance with the present invention can be implemented as a method of thermal control, thermal gradient control, and efficiency control for regeneration of the DPF. It is important that the method disclosed herein can be used with any control system able to determine either the wet soot fraction or the estimated time required to clear the wet soot resident on the DPF.

By way of example, a method will now be described that allows for the accurate determination of wet soot and dry soot engine out fractions, as well as for their integration over time and the net accumulation of wet soot and dry soot mass. This method allows for the determination of the volatile wet soot component resident on the filter at any point in time and thus the risk of spontaneous combustion and need for regeneration.

Referring to FIG. 1, Curve 06 is the total soot load can be allowed to accumulate safely in a CDPF as a function of the percentage of the wet soot mass component (item 52, FIG. 5) resident on the filter. Any soot load above Curve 06 is in danger of spontaneous and uncontrolled combustion. Thus, Curve 06 is defined herein as the locus of all soot loads have a Combustibility Index of 1.0. (Of course, FIG. 1 is exemplary for only a specific diesel engine having a specific-size CDPF; the actual allowable soot load in any application of the present invention will depend upon multiple parameters such as, for example, the size of the engine and the size of the CDPF).

The rationale for this method is based on the relationship between the rapid, non-uniform, exothermic release from light-off/ignition of the wet soot and the total thermal burden carried by the DPF substrate. In the event of an uncontrolled warm up and light-off cycle, this wet volatile soot may produce localized hot spots in the CDPF that can exceed the melting temperature of the substrate material or which can create excessive thermal stress gradients due to the non-uniform soot distribution that occurs during accumulation, resulting in loss of regeneration control.

In FIG. 1, Case 1 is a representative example of the relationship between a relatively low wet soot fraction and the allowable total wet soot mass regeneration target. In this case, the total allowable soot mass is relatively high (42 g) because of the decreased volatility and lower potential, non-uniform, exothermic heat release of the relatively low wet soot fraction (11%); i.e., 42 g of total soot may be allowed to accumulate before the Combustibility Index reaches 1.0, necessitating initiation of a regeneration event.

On the other hand, Case 2 is a representative example of the relationship between a high wet soot fraction and the allowable total wet soot mass regeneration target. In this case, the total allowable soot mass is relatively low (10 g) because of the increased volatility and higher potential, non-uniform, exothermic heat release of the relatively high wet soot fraction (59%); i.e., only 10 g of total soot may accumulate before the combustibility Index reaches 1.0, necessitating initiation of a regeneration event.

It is this fundamental relationship that forms the basis for the following DPF regeneration control strategy. The fundamental inputs of wet soot fraction, dry soot fraction, wet soot mass, dry soot mass, and the relationships between these data are used in various ways to deploy a DPF total thermal management process.

Figure 2:
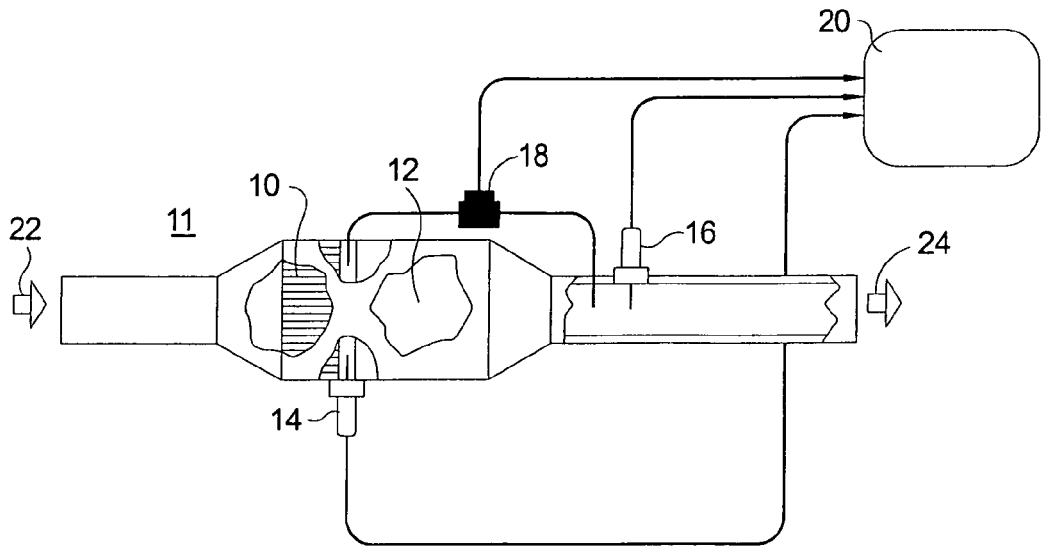
FIG. 2 is a schematic diagram in accordance with the invention of a diesel exhaust system having capability for regeneration of a catalytic diesel particulate filter and a lean nitrogen trap.

Referring to FIG. 2, a typical CDPF and instrumentation configuration is shown. This configuration includes a collocated Diesel Oxidation Catalyst (DOC) 10 for a diesel engine 11, a catalytic Diesel Particulate Filter (CDPF) 12, inlet and outlet temperature sensors 14,16, and a delta pressure sensor 18. The delta-pressure sensor is not required for the determination of soot mass resident on the filter. However, if present, it can be used as a secondary total mass indicator or serve as a redundant data source in the event of a logic failure. Data are fed to an Engine Control Module (ECM) 20. Engine exhaust enters 22 the apparatus, is stripped of emissions contaminants including carbon particles (CDPF) and unburned diesel fuel (DOC), and exits 24 the apparatus. ECM 20 also monitors various other engine operating parameters such as but not limited to engine speed, torque load, head temperature, mass air flow, intake air temperature, exhaust temperature, fueling rate, and temperature within the CDPF, as is known in the prior art.

Various research activities and disclosures have attempted to make a correlation during a regeneration event between DPF temperature ramp rate and the realized DPF peak temperature. Such prior art attempts, however, do not recognize the relationship between the quantity of wet soot present and the high rate at which this soot is oxidized as a fundamental source of instantaneous heat. In the present control method, the quantity, presence, and to a lesser degree, the distribution of wet soot inside the filter serve as the primary indicators governing the relationship between peak temperature and thermal gradient. The general knowledge of wet soot distribution in a CDPF comes from engine flow testing, which indicates that the wet soot accumulation is weighted in its distribution to the rear of the filter. This is directly related to the momentum of the relatively heavy, wet soot particles, which allows these particles to travel into the rear of the filter. This is also a fundamental issue driving excessive localized temperatures during a typical regeneration. As a significant amount of the wet soot collects in the rear of the filter, the potential exists for a high and rapid exothermic release, which property in combination with the overall rearward flow of hot regenerative gases from the preceding portion of the filter causes great risk for localized heating and high thermal stress gradient in the filter monolith during regeneration, whether spontaneous or otherwise.

Figure 3:
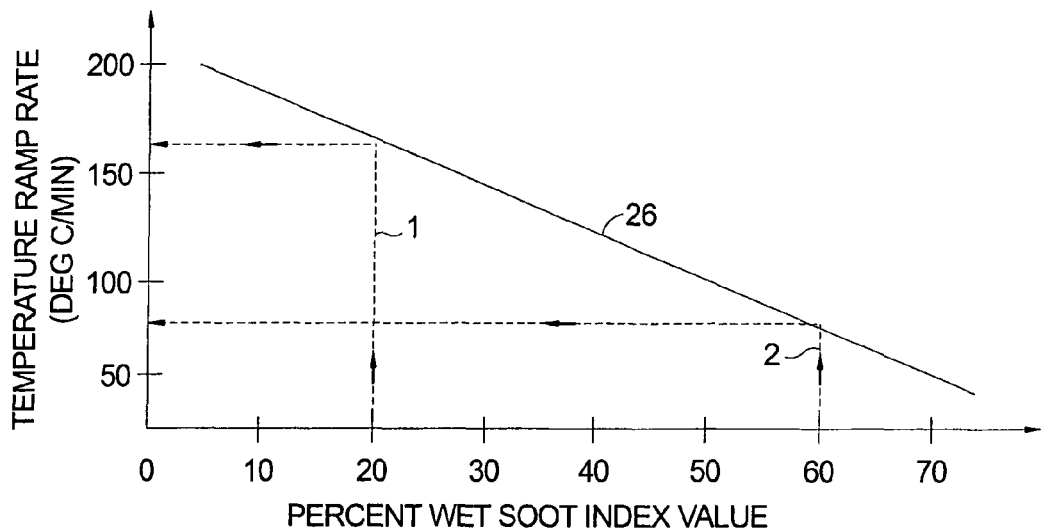
FIG. 3 is a graph showing the maximum permissible temperature ramp rate as a function of the percentage of wet soot present in the total soot accumulation in a CDPF.

FIG. 3 represents the relationship between the wet soot fraction resident on the filter and the allowable temperature ramp rate during the warm-up phase of regeneration to slowly oxidize the volatile soot load without creating a rapid exothermic heat release. As indicated, (Example 1) at a 20% wet soot value, the allowable temperature ramp rate is about 160 degrees/minute. Conversely, (Example 2) at a 60% wet soot value, the allowable temperature ramp rate is only about 85 degrees/minute. Note that ramp rate curve 26 represents the loaded table values shown below in FIG. 6, DPF Reductant Control Logic.

Figure 4:
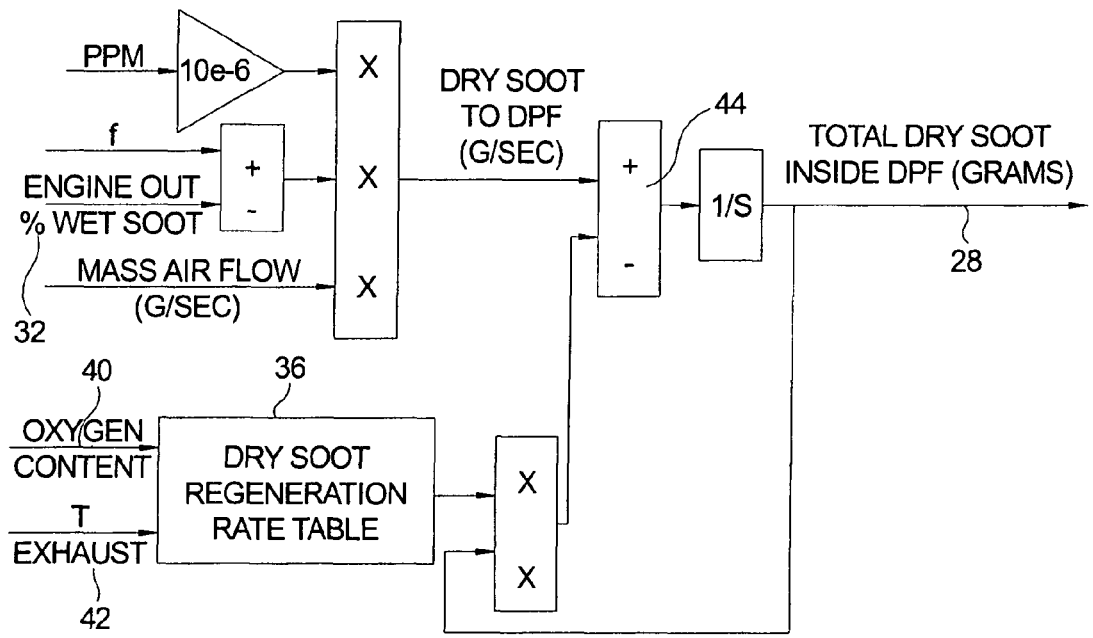
FIG. 4 is a logic diagram for determining the accumulation and the reduction of dry soot at any time within the CDPF, based on the history of engine operating conditions.
Figure 5:
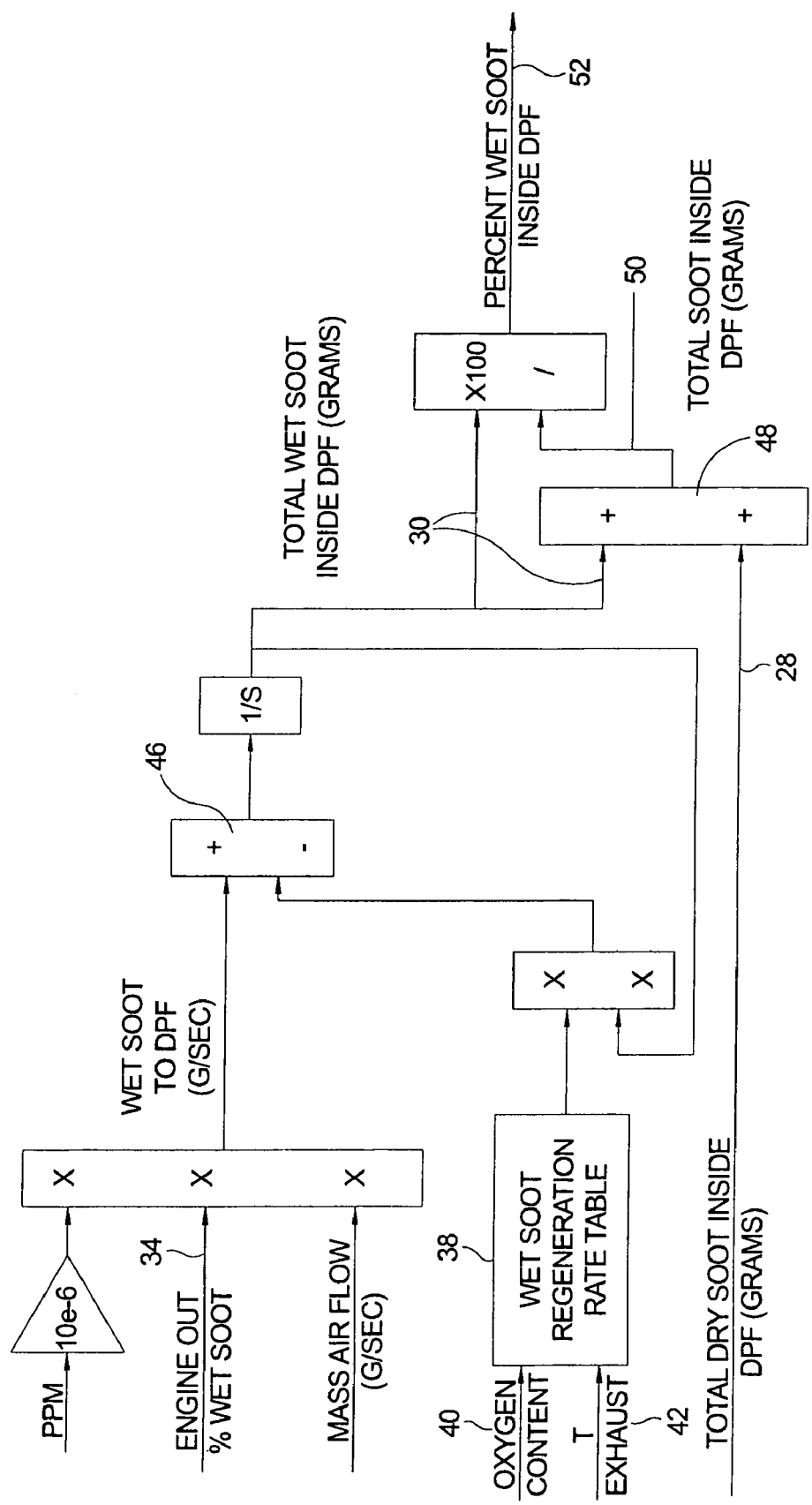
FIG. 5 is a logic diagram similar to that shown in FIG. 4, for determining the accumulation and the reduction of wet soot at any time within the CDPF, based on the history of engine operating conditions.

FIGS. 4 and 5 represent the soot mass accumulation and reduction logic for dry soot 28 and wet soot 30, respectively. These functions utilize the engine-out dry and wet soot production 32,34 of a model. Recall that both dry and wet soot are dynamically being both added to and subtracted from the CDPF by continuous flow of exhaust gas therethrough, and these dynamic additions and subtractions must be taken into account. Additionally, a function 36,38 accounting for the effects of spontaneous regeneration as a function of exhaust oxygen availability 40 and exhaust gas temperature 42 is incorporated for offsetting of the effects of wet soot drying and wet and dry soot oxidation in a non-regeneration state. These functions are derived from chemical equivalence models and must be calibrated for accuracy.

The combination of soot accumulation and drying/oxidation cumulatively performs in the time domain effectively as Up/Down integrators 44,46. The total wet soot 30 is added 48 to the total dry soot 28 to yield total soot 50 inside the DPF. The total wet soot 30 is also divided by the total soot 50 and multiplied by 100 to yield a percent wet soot 52 inside the CDPF. This provides a model-based accounting measure to enhance accuracy of wet soot percentage and total soot accumulation during a given filter accumulation period.

Referring back to FIGS. 1 and 3, it is seen that percent wet soot 52 becomes the entry point for determining both the maximum allowable total soot load in the filter before beginning a regeneration event (FIG. 1) and the maximum allowable temperature ramp rate (FIG. 3).

Figure 6:
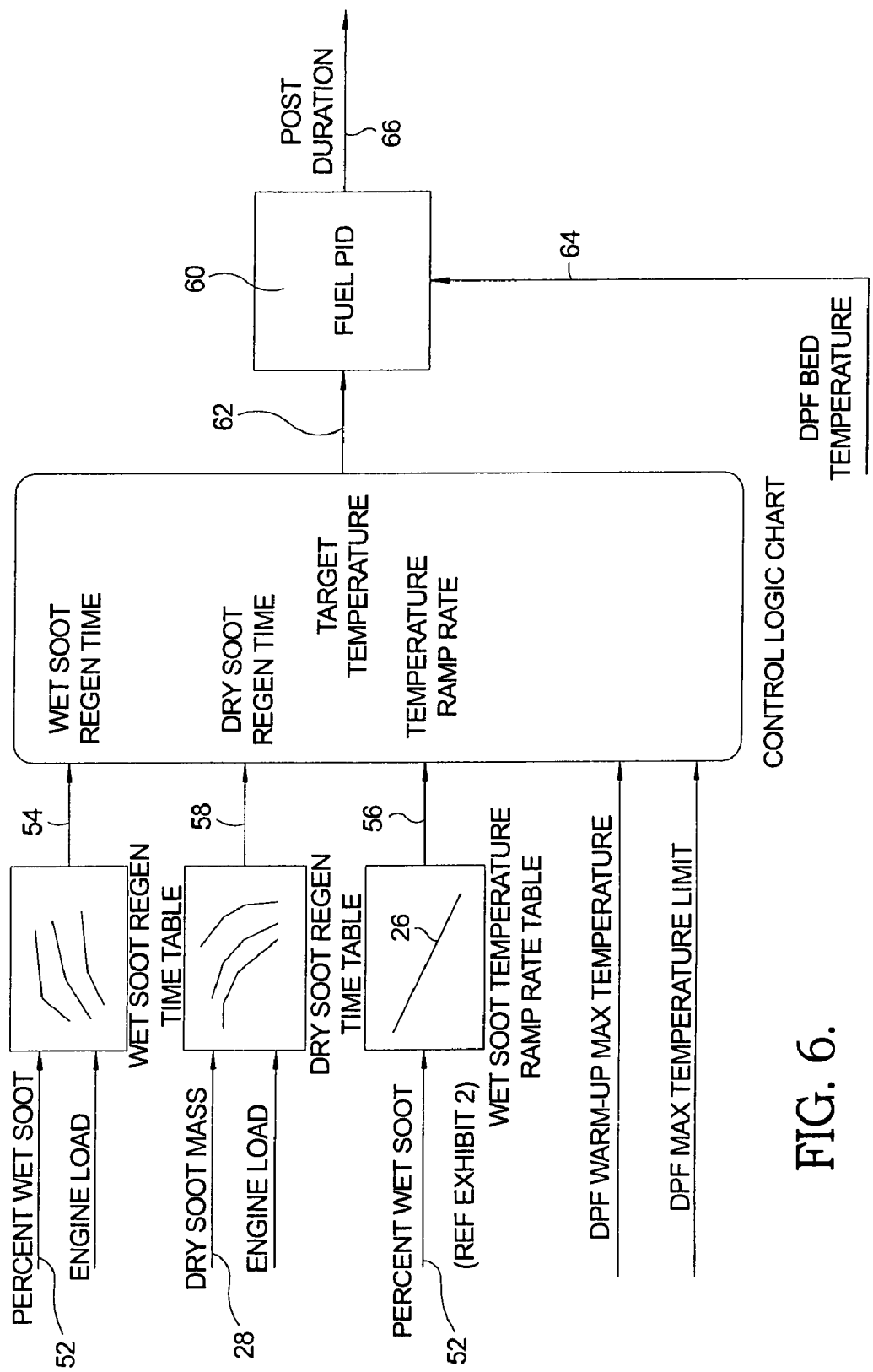
FIGS. 6 and 7 are logic diagrams for control of soot reductants (fuel and oxygen) in the CDPF.

FIG. 6 illustrates the control concept of the present invention for reductant control. As defined in this embodiment, "reductant" specifically applies to the conversion of post-combustion injected hydrocarbons across the DOC to produce the downstream heat necessary for CDPF regeneration. Alternative methods of fuel injection, such as down-pipe fuel injection, may be used but the concept remains unchanged.

The concept relies initially on a model-based time estimate required for the warm-up period of the CDPF for priority oxidation and clearing of wet soot in the filter. As referenced in FIG. 6 and noted above, this temperature ramp rate is determined by the criteria established in FIG. 3. During this warm up period, a method for increasing the temperature/time step per the determined ramp rate is provided for, preferably by means of a custom fuel PID (Proportional/Integral/Differential) control 60. This is a calibrated response, driven by the difference between the sustainable output target temperature 62 and the input DPF bed temperature 64. Once the primary time criterion and warm up temperature targets 54,56 are met for oxidation of the wet soot fraction, the control strategy logic switches to a dry soot regeneration phase, which, being far less exothermic, may be driven by a regeneration target temperature and the actual DPF bed and/or outlet temperature. It should be recognized that regeneration time 58 should be supported by a secondary measurement proxy for best efficiency and utility.

Figure 7:
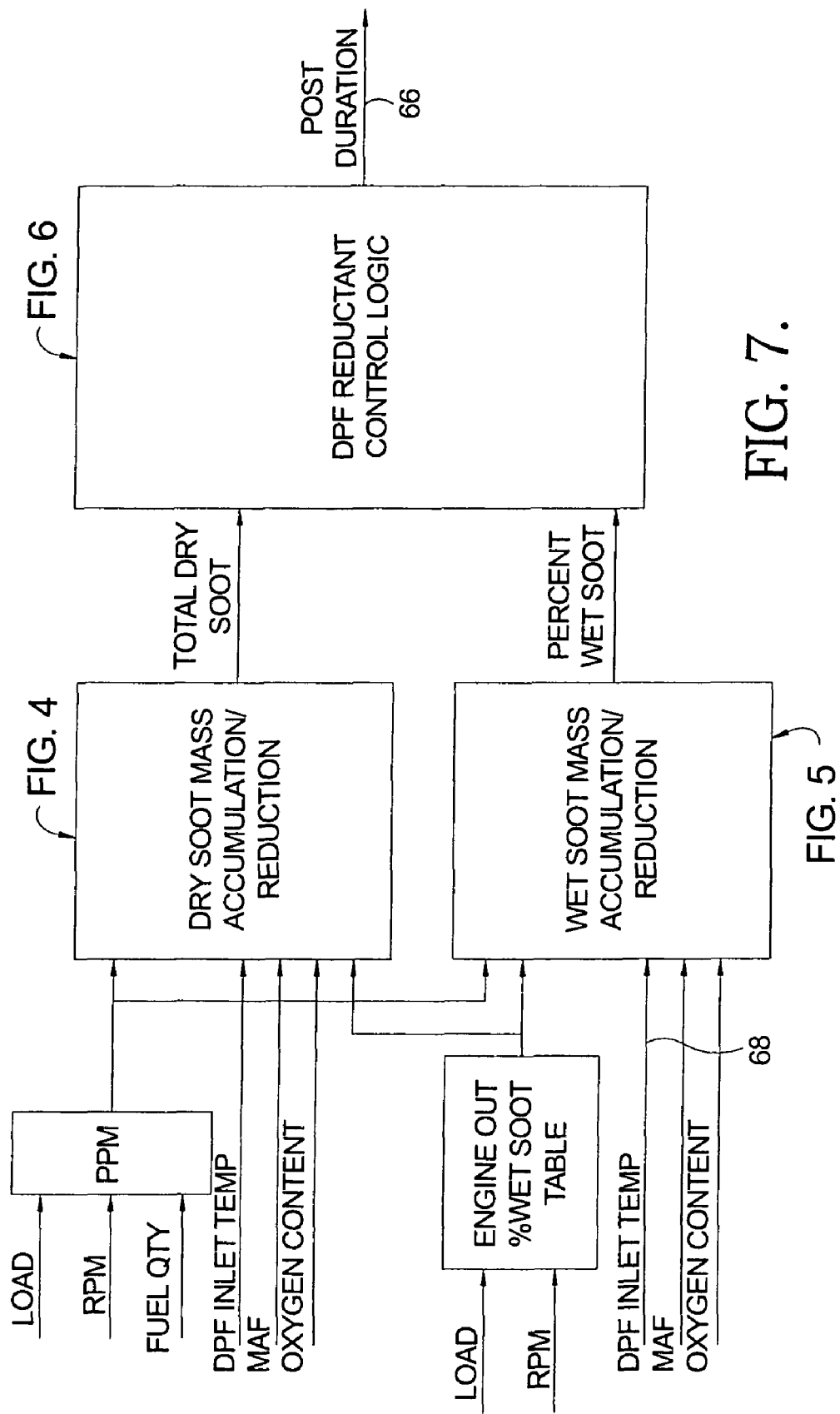

FIG. 7 integrates all the components discussed herein to represent the overall control methodology for regenerative control. It can be seen that by following the above figures in sequence, a layered control structure and connectivity is achieved. The Up/Down integrators are constantly updated from engine-out soot model via the data train of engine operating conditions. The output of the integrators is fed into the DPF Reductant Control Logic, which information is then used to determine continuously the required warm-up ramp rate for wet soot clearing and the respective wet/dry soot regeneration times per FIG. 6. The Target Temperature is then sent to the fuel PID and the required fuel post-injection command 66 is issued.

Figure 8:
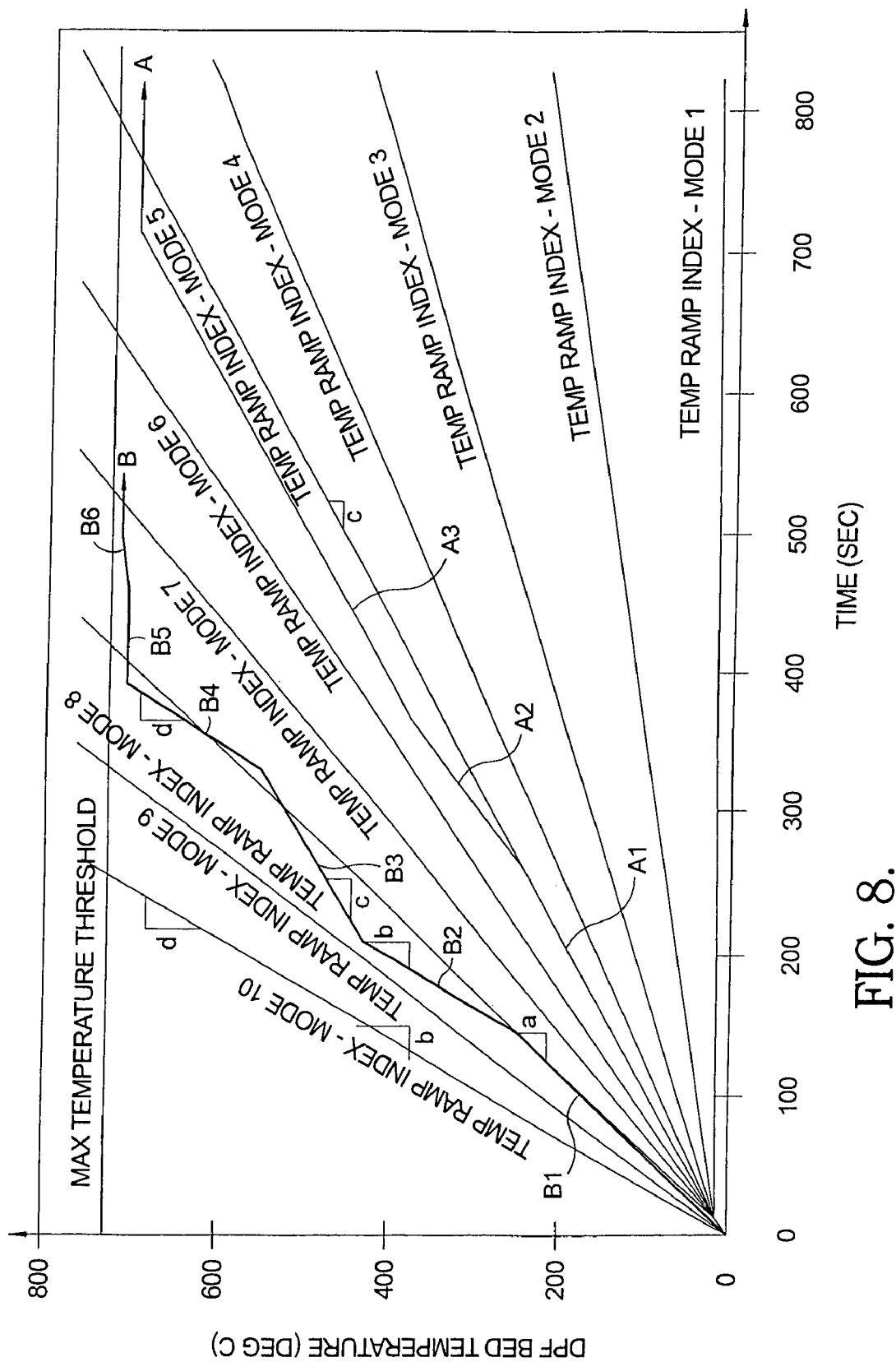
FIG. 8 is a graph showing DPF bed temperature as a function of regeneration in accordance with the present invention, showing two different exemplary regeneration paths.

So, how is this all used within the code of the DPF Reductant Control Logic and wet soot regeneration strategy? FIG. 8 is a representative embodiment of the control logic. In a real-world application of vehicle use, the regeneration period is far too long for it to occur at a fixed rpm and load. At its most developed form, the logic must be able to respond to changing engine operating conditions during regeneration. Specifically, the time required for the warm up period and the level of temperature control required to clear the wet soot fraction require a more sensitive method of regeneration than currently disclosed in the prior art. As such, the control must be able to respond to real-time changes in the ramp rate control value based on total engine mass flow and temperature. An additional benefit of this structure is increased fuel economy by means of reduced fuel penalty both by using heat scavenged from the engine when possible in place of post-injection and by reducing the overall warm-up period over which fueling is required to produce the heat required for regeneration. This is represented by the following examples.

In FIG. 8, two representative regeneration temperature ramp rate profiles are illustrated, Profile A and Profile B. Additionally, various slope identifier tags indicate the relationship between the Mode Line and temperature ramp rates during the variable warm up profile. The Max Temperature Threshold line depicts the post-injection hard stop fueling cut-off line for the PID to avoid DPF temperatures that may exceed the material thermal limits of the filter substrate.

EXAMPLE A

Figure 9:
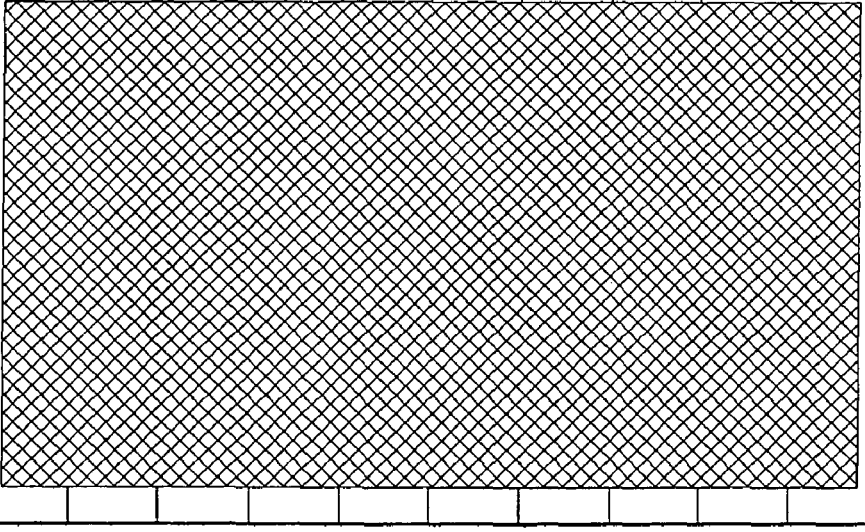
FIG. 9 is a table showing data points for ramp rate, mode line number, and volatility index used in construction of the graph of FIG. 8.

At the initiation of regeneration, the fuel PID of FIG. 6 begins commanding the introduction of post combustion fuel injection to produce hydrocarbons required to heat up the DOC 10 (FIG. 2) to the current time step calculated regeneration Target Temperature 62 (FIG. 6), which is based on the existing DPF inlet temperature 68 (FIG. 7) at the time of initiation and is increased by the sum of all the products of the ensuing time steps times the temperature ramp rate depicted in FIG. 9, the Mode Line Index. From this process, it can be determined for Profile A that the engine operating condition is stable from regeneration initiation at time zero until time period 250 seconds (A1), increasing at a rate corresponding to slope "x" (Mode Line 5, ramp rate=0.90 degrees/sec). The regeneration Target Temperature used for PID control is now approximately 225 degrees. At this point, the operating conditions of the engine and remaining wet soot fraction are such that the control logic recognizes that a transition can be made to a higher, more efficient, temperature ramp rate (A2) depicted by slope "y" (Mode Line 7, ramp rate=1.4 degrees/sec). At an elapsed regeneration time of 360 seconds, the engine operating conditions become such that the logic requires a transition back to a lower ramp rate (A3) corresponding to the original slope "x" (now called slope "z" and once again, Mode Line 5, ramp rate=0.90 degrees/sec). The reasons for such a reduction may include embedded logic limiting thresholds to avoid thermal overshoot, or drastic changes in the engine operating conditions that will naturally elevate the temperature of the incoming exhaust gas stream at a rate that exceeds the PID's ability to respond in a timely manner.

The progress of regeneration Example "A" happens such that the operating conditions remain stable through the remainder of this particular regen event until the wet soot is cleared and the dry soot regen temperature threshold is met. At this point, the overall regen logic transitions to the dry soot clearing state of operation.

The preceding Example "A" demonstrates the transitory nature and pragmatic flexibility of a wet soot regeneration control strategy in accordance with the present invention. The regeneration profile of example "B" demonstrates further the variable nature of the regeneration sequence. The relationship between various Mode Lines and ramp rate slopes is the same as for example "A". The difference is in the number of transitions required due to sequential variance in engine operation conditions during this particular regeneration event. Example "A" incurs only two transitions, whereas Example "B" requires five transitions and six regeneration stages (B1,B2, B3,B4,B5,B6) over the period but actually completes the wet soot clearing phase in less total time. This is due to the effects of the utilization of scavenged heat (engine load) at the DPF inlet, the ability to introduce heat more rapidly (Mode Lines-ramp rate) as a function of total mass flow, heat scrub rate (heat conveyance out of the DPF), and the effect of the volatility relationship (wet soot/dry soot ratio) on the filter load.

FIG. 9 shows the relationships in the development of the temperature ramp rates of FIG. 8. This recognizes that the total heat budget must be balanced as an input function to the logic controller for the addition of heat required in an active regeneration of the DPF. The indexing of the Mode Lines is intended to simplify the deployment of such a strategy as it facilitates the iterative function for ramp rates "off the table indices". In other words, the table can be populated further with control Mode Lines interpolated for points between table values.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for triggering a regeneration event of a particulate filter disposed in an exhaust stream of a diesel engine, comprising the steps of:
   a) programming a first algorithm into an Engine Control Module, said first algorithm providing combined limiting values for amounts of wet soot and total amount of soot allowable in said particulate filter;
   b) determining an amount of said wet soot and an amount of said total soot present in said particulate filter; and
   c) triggering said regeneration event when any of said combined limiting values is reached or exceeded.

2. A method in accordance with claim 1 wherein said determining step is performed continuously during operation of said engine.

3. A method in accordance with claim 1 wherein said determining step includes at least the sub-steps of:
   a) determining a temperature ramp rate for combustion of said amount of wet soot during said regeneration event; and
   b) calculating oxygen and fuel levels in said exhaust gas necessary to result in said determined temperature ramp rate.

4. A method in accordance with claim 3 comprising the further sub-steps of:
   a) calculating a net rate of wet soot accumulation in said particulate filter; and
   b) calculating a net rate of dry soot accumulation in said particulate filter.

5. A method in accordance with claim 4 wherein said calculating steps include:

a) allowances for gross rates of wet and dry soot accumulation from exhaust gas passing through said particulate filter; and
b) allowances for gross rates of wet and dry soot reduction by exposure to exhaust gas passing through said particulate filter.

6. A method in accordance with claim 5 comprising the further steps after said triggering step of:
a) first controlling said triggered regeneration event along said temperature ramp rate for reduction of said amount of wet soot; and
b) second controlling said triggered regeneration event below a maximum allowable particulate filter temperature for reduction of said amount of dry soot.

7. A method in accordance with claim 6 wherein said first and second controlling steps are carried out by controlling said oxygen and fuel levels in said exhaust gas entering said particulates filter.

8. A diesel engine comprising a diesel particulates filter in the exhaust gas stream of said engine, wherein regeneration of said diesel particulates filter is controlled by an Engine Control Module,
wherein a first algorithm is programmed into said Engine Control Module, said first algorithm providing combined limiting values for amounts of wet soot and total amount of soot allowable in said particulate filter, and
wherein said Engine Control Module continuously determines an amount of said wet soot and an amount of said total soot present in said particulate filter during operation of said engine; and
wherein said Engine Control Module triggers a regeneration event when any of said combined limiting values is reached or exceeded.

* * * * *